United States Patent
Wigren et al.

(10) Patent No.: US 9,031,576 B2
(45) Date of Patent: May 12, 2015

(54) COLLECTIVE POSITIONING IN MOBILE COMMUNICATION SYSTEMS

(75) Inventors: Torbjörn Wigren, Uppsala (SE); Dirk Gerstenberger, Kista (SE); Bo Göransson, Sollentuna (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1369 days.

(21) Appl. No.: 12/438,470

(22) PCT Filed: Aug. 23, 2006

(86) PCT No.: PCT/SE2006/050292
§ 371 (c)(1),
(2), (4) Date: Feb. 23, 2009

(87) PCT Pub. No.: WO2008/024041
PCT Pub. Date: Feb. 28, 2008

(65) Prior Publication Data
US 2010/0234043 A1 Sep. 16, 2010

(51) Int. Cl.
*H04W 64/00* (2009.01)
*G01S 5/00* (2006.01)
*G01S 5/02* (2010.01)
(Continued)

(52) U.S. Cl.
CPC ............ *H04W 64/00* (2013.01); *G01S 5/0009* (2013.01); *G01S 5/0257* (2013.01); *H04L 12/189* (2013.01); *H04W 4/06* (2013.01)

(58) Field of Classification Search
CPC ... G02S 5/0257; G02S 5/0009; H04L 12/189; H04W 4/06; H04W 64/00
USPC ............ 370/338, 346, 335; 455/456.1, 456.2, 455/456.5, 456.6, 404.2, 456.3, 457; 701/127; 702/155, 158; 340/988, 340/539.13, 8.1; 342/457, 367, 450
See application file for complete search history.

(56) References Cited

U.S. PATENT DOCUMENTS

| | | | |
|---|---|---|---|
| 5,119,502 A * | 6/1992 | Kallin et al. | 455/434 |
| 6,097,958 A | 8/2000 | Bergen | |
| 6,687,504 B1 * | 2/2004 | Raith | 455/456.1 |

(Continued)

FOREIGN PATENT DOCUMENTS

| | | | |
|---|---|---|---|
| EP | 874248 A2 * | 10/1998 | |
| GB | 2248749 A | 4/1992 | |

*Primary Examiner* — Mahendra Patel
(74) *Attorney, Agent, or Firm* — Coats & Bennett, PLLC

(57) ABSTRACT

Methods and devices for managing a cellular communication system (1) and mobile terminals (40) are presented. A collective positioning measurement order (50) is issued to a multitude of mobile terminals (40) in a first cell (10) of the cellular communication system (1). This issuing is preferably performed intermittently at a multitude of times according to a predetermined rule. Each mobile terminal (40) receives information concerning a collective positioning measurement order. The mobile terminal (40) performs a positioning operation, typically a positioning measurement on a ranging signal (51, 52) or transmission of a ranging signal (53), preferably intermittently at a multitude of times, according to a predetermined rule based on the information concerning the collective positioning measurement order. An updating of a storage with positioning data can preferably be obtained. In terrestrially based positioning systems, signal resources dedicated to positioning measurement can be reserved in the cellular communication system.

50 Claims, 10 Drawing Sheets

(51) Int. Cl.
*H04L 12/18* (2006.01)
*H04W 4/06* (2009.01)

(56) References Cited

U.S. PATENT DOCUMENTS

| | | |
|---|---|---|
| 6,937,866 B2 * | 8/2005 | Duffett-Smith et al. ... 455/456.1 |
| 7,212,830 B2 * | 5/2007 | Tamaki et .................. 455/456.1 |
| 7,215,969 B2 * | 5/2007 | Benco et al. ................ 455/456.6 |
| 7,826,343 B2 * | 11/2010 | Krasner ......................... 370/208 |
| 2004/0266457 A1 * | 12/2004 | Dupray ...................... 455/456.5 |
| 2005/0001720 A1 * | 1/2005 | Mason et al. ............ 340/539.13 |
| 2006/0052115 A1 * | 3/2006 | Khushu ..................... 455/456.3 |
| 2006/0089154 A1 * | 4/2006 | Laroia et al. ............... 455/456.2 |
| 2009/0005031 A1 * | 1/2009 | Van Lieshout et al. ....... 455/425 |

* cited by examiner

COLLECTIVE POSITIONING IN MOBILE COMMUNICATION SYSTEMS

TECHNICAL FIELD

The present invention relates in general to managing of positioning tasks in mobile communication systems.

BACKGROUND

Accurate positioning in wireless cellular systems is important and will become even more important when regulators are forcing operators to fulfill e.g. E911 (in the US) and E112 (in EU) emergency location requirements. In such situations it is particularly important to secure good performance in terms of availability, response time and accuracy. Furthermore, different kinds of additional services based on the position of a mobile terminal become more and more common.

In order to obtain accurate positioning information there are a number of different approaches that are available in cellular systems today. Some of them are based solely on measurements conducted within the radio network itself, while others use external sources such as satellite positioning systems to acquire the position in the cellular system. Some methods involve measurements or other actions performed by the mobile, while other methods rely on information obtained in other ways. Generally, most methods of high accuracy involve actions performed by the mobile terminal.

High precision positioning methods are in the present disclosure intended to denote positioning methods that have a potential to meet the North-American E-911 emergency positioning requirements. Methods that meet these requirements are capable of obtaining positioning accuracies of either 50 meters (in 67% of all cases) and 150 meters (in 95% of all cases) for terminal based methods, or 100 meters (in 67% of all cases) and 300 m (in 95% of all cases) in network based methods.

Positioning by solely identifying the cell in which the mobile is hosted does basically not involve the mobile terminal. However, such a cell ID positioning can be enhanced, e.g. by combining it with determinations of distance to a base station, e.g. based on round trip time measurements.

Among terminal based methods can also be mentioned e.g. assisted GPS (A-GPS) positioning, where satellite signals are utilized for positioning purposes. Cellular radio signal time differences can also be utilized, e.g. Uplink Time Difference Of Arrival (UTDOA) positioning or the downlink counterpart Observed Time Difference Of Arrival-Idle Period Down Link (OTDOA-IPDL).

In general, a procedure for positioning of a mobile terminal with a terminal based positioning method always requires the issue of a positioning order from a positioning node in the stationary part of the cellular communications system. The positioning order is directed only to the terminal to be positioned and is issued when a positioning is requested from any party within or connected to the communications system, having appropriate authority. The terminal performs the requested positioning actions and report the result in terms of a position or measurement results to a cellular system node, typically a positioning node.

A general problem with prior art positioning management is that the availability, response time and accuracy are not always satisfactory. If many terminals within a limited area are of use for positioning services at the same time, the amount of signaling resources occupied by management messages may be large, possibly resulting in lack of availability or an unsatisfactory response time. Furthermore, several of the available positioning methods are relatively time consuming, at least if high accuracy determinations are requested. There are also some limitations in possibilities of performing any positioning at all, e.g. for indoor situations.

The different positioning approaches have furthermore additional specific problems. In order to obtain good positioning performance e.g. with GPS, a substantial number of satellites need to be visible from the terminal. This makes satellite based positioning methods less suitable e.g. for indoor use. Fine time assistance systems have to be employed, which, however, typically requires additional functionality in the network.

For terrestrial methods based on downlink measurements, an obstacle is the number of detectable signals. In order to have good performance and to meet e.g. E-911 emergency positioning requirements, signals from at least 6-8 non co-located signal transmission positions need to be detected in a downlink based positioning system. This will in general, not only require long measurement times, but also good signal conditions with respect to the transmitting sites. Note that the problem is particularly difficult in code division multiple access (CDMA) systems. The reason is that all sites transmit in the same frequency band. This results in a near-far problem, where terminals close to the transmitting site of the own cell, experience extensive interference from said own site, a fact that prevents detection of signals from other more distant transmitting sites. This problem is exactly what has prevented full-scale implementation of the OTDOA-IPDL positioning method.

Similar problems exist for the uplink case, where power up may be needed in order to secure hearabilty in distant receiving sites. This occurs since in CDMA systems the transmitting power of terminals is normally controlled by the radio base station (RBS), so that all terminals in the cell are detected at comparable power levels in the RBS. Hence, terminals close to the RBS of the own cell are not likely to transmit at a power level that are sufficient for detection at distant RBS's.

SUMMARY

An object of the present invention is therefore to improve the possibilities for positioning methods to provide good availability, response time and positioning accuracy.

The above object is achieved by methods and devices according to the enclosed patent claims. In a first aspect of the present invention, a method for managing a cellular communication system comprises issuing of a collective positioning measurement order to a multitude of mobile terminals in a first cell of the cellular communication system. This issuing step is performed at least once and preferably intermittently at a multitude of times according to a predetermined rule.

In a second aspect of the present invention, a method for managing a mobile terminal for use in a cellular communication system comprises receiving, from a base station of said cellular communication system, of information concerning a collective positioning measurement order. The method further comprises performing of a positioning operation, preferably intermittently at a multitude of times, according to a predetermined rule based on the information concerning the collective positioning measurement order. Preferably, an updating of a storage with positioning data can thereby be obtained by this step of performing a positioning operation.

In a third aspect of the present invention, a cellular communication system node comprises means for issuing a collective positioning measurement order to a multitude of mobile terminals in a first cell of the cellular communication system. This means for issuing is arranged for performing the issuing at least once and preferably intermittently at a multitude of times according to a predetermined rule.

In a fourth aspect of the present invention, a mobile terminal for use in a cellular communication system comprises a receiver, arranged for receiving, from a base station of the cellular communication system, information concerning a collective positioning measurement order. The mobile terminal further comprises a positioning manager connected to the receiver and arranged for performing a positioning operation intermittently, preferably at a multitude of times, according to a predetermined rule based on the information concerning the collective positioning measurement order. The mobile terminal preferably also comprises a data storage, connected to the measurement manager and arranged for storing positioning data from the positioning manager.

There are many advantages by the proposed invention. One advantage is that the performance of the positioning function typically is improved when terminals are positioned repeatedly since not too old previous results can be utilized. The benefits could be e.g. a reduced required number of detectable positioning signals or a faster lock-on procedure. Furthermore, the handling of the positioning function in the node that serves the terminal may be simplified, since less dedicated signaling is needed. Signaling resources, for ordering of positioning measurements, are reduced using a single collective command. Moreover, the consumed signaling resources and possible terrestrial ranging resources are minimized since the terminals are using the same assistance information and ranging signals.

The present invention proposes a radically new concept aimed towards coming super 3G (S3G) cellular systems. It is stressed that the invention is not a positioning method as such, rather the principles of the managing processes of the invention is applicable to several existing and future positioning methods.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
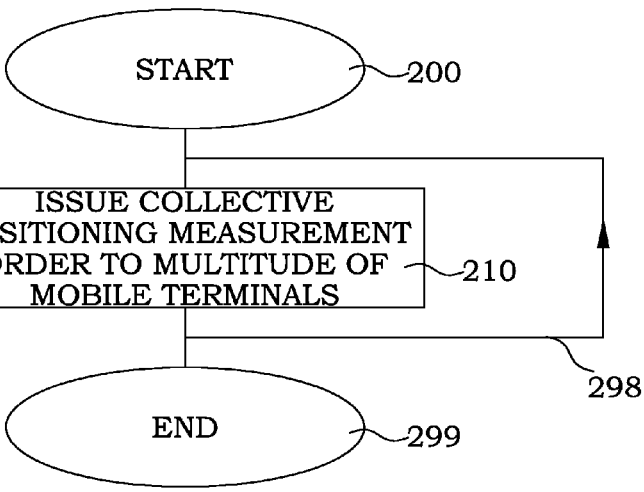
FIGS. 1-3 are flow diagrams of main steps of embodiments of methods for managing a cellular communication system according to the present invention.

The present invention relies on the understanding that positioning properties such as availability, response time and positioning accuracy typically improve if collective ordering and consecutive position determinations are performed within a reasonable time period. The result from the first position determination can often be used for simplifying or improving the accuracy of a second position determination. Examples of this will be given further below. In general, a long time between consecutive positionings gives a small benefit; a short time between consecutive positionings gives a larger benefit. The improvements can be in terms of one or more of availability, response time and positioning accuracy.

In the beginning of the use of cellular communications, positioning was not a very central issue, and the amount of times when positioning actually was requested was relatively small. This resulted in communication standards, where positioning requests are processed basically on a case-to-case basis. By realizing that keeping the position of a mobile terminal updated has such important benefits in successive positioning procedures, the basic principles of handling positioning tasks in prior art could be questioned.

In contrast to previous positioning methods where the positioning service is performed user by user, a method is here proposed that performs collective positioning simultaneous for all, or at least a multitude of, capable users in the system.

A concept of use in the invention is to reserve resources for simultaneous positioning of all, or a selected set of, capable terminals in at least one cell. These resources would handle the issuing of positioning measurement orders to all referred terminals, by the use of only one measurement order, i.e. a collective positioning order. There is thus a benefit in making the actual ordering more efficient.

The collective ordering also opens up for possible additional efficiency improvements. Another concept of use with this invention, when applied to positioning methods based on signals originating within the communication network itself, is to reserve, periodically or at need, positioning resources. These positioning resources are e.g. in terms of a time slot. The reserved positioning resources are used for transmitting known signals in selected cells. Note that the positioning resource may also be constituted by certain codes, e.g. in a CDMA system, by certain frequencies (tones), e.g. in a cellular system based on OFDM, or other resources suitable for the multiple access method at hand. The positioning resource signals should preferably occupy a significant part of the transmission bandwidth to get good accuracy. To increase the detection probability, the signals should preferably have good properties such as low cross correlation.

All the mobile terminals can then use these reserved positioning resources, typically ranging signals for terrestrial positioning, from as many cells as possible, to keep their positions and internal positioning states updated. Alternatively, a collective positioning may be ordered for all terminals in the cell by the positioning node. The results from the measurements can also optionally be fed back to the system where the position of each terminal can be computed. Even if the overhead of such signals might seem large, using e.g. every 50th to 100th time slot, it can be noted that the position of each and every mobile in the system is obtained at all instances in time. This avoids the need for continuous multiple control signaling, e.g. containing assistance data, except for one initial setup message. Furthermore, as will be further explained below, the performance of the terminals is typically improved, both in terms of sensitivity and positioning time.

FIG. 1 illustrates a flow diagram of the main step of an embodiment of a method for managing a cellular communication system according to the present invention. The procedure starts in step 200. In step 210, a collective positioning measurement order is issued to a multitude of mobile terminals in a first cell of the cellular communication system. The collective positioning measurement order can be directed to all mobile terminals connected to the cell in question. The collective positioning measurement order can also be restricted. One restriction is the capability of the mobile terminals. The collective positioning measurement order may therefore be directed only to mobile terminals having any positioning capability at all, or to terminals with selected capabilities for positioning. The selection of mobile terminals to which the collective positioning measurement order can also be performed according to any other principle, giving a selected set of a multitude of mobile terminals, which are affected by the collective positioning measurement order. The step 210 is preferably performed intermittently at a multitude of times according to a predetermined rule as indicated by the arrow 298. The procedure ends in step 299.

The actual method for determining the position is not specified in this general view and the collective positioning measurement order could e.g. concern positioning based on satellite signals or positioning based on signals of the cellular communication system itself. Likewise, the collective positioning measurement order could concern different terrestrial positioning approaches, e.g. selected among OTDOA-IPDL, UTDOA and Cell ID enhanced with distance measure.

Figure 2:
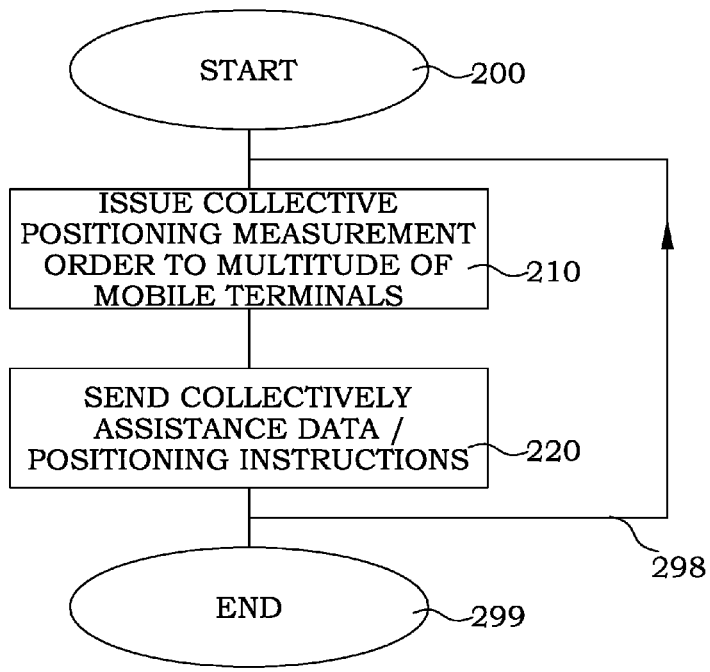

FIG. 2 illustrates a flow diagram of the main step of another embodiment of a method for managing a cellular communication system according to the present invention. The procedure starts in step 200. In step 210, a collective positioning measurement order is issued to a multitude of mobile terminals in a first cell of the cellular communication system. In step 220, additional information in assisting in the positioning is transmitted, also in a collective manner. Such assisting data could e.g. be assistance data for A-GPS positioning or information informing about which radio resources that are to be used for terrestrial positioning methods. By sending such data as a collective message to a multitude of mobile terminals, large amounts of signaling resources are saved. The steps 210 and 220 are preferably repeated intermittently at a multitude of times according to a predetermined rule as indicated by the arrow 298. The procedure ends in step 299.

Figure 3:
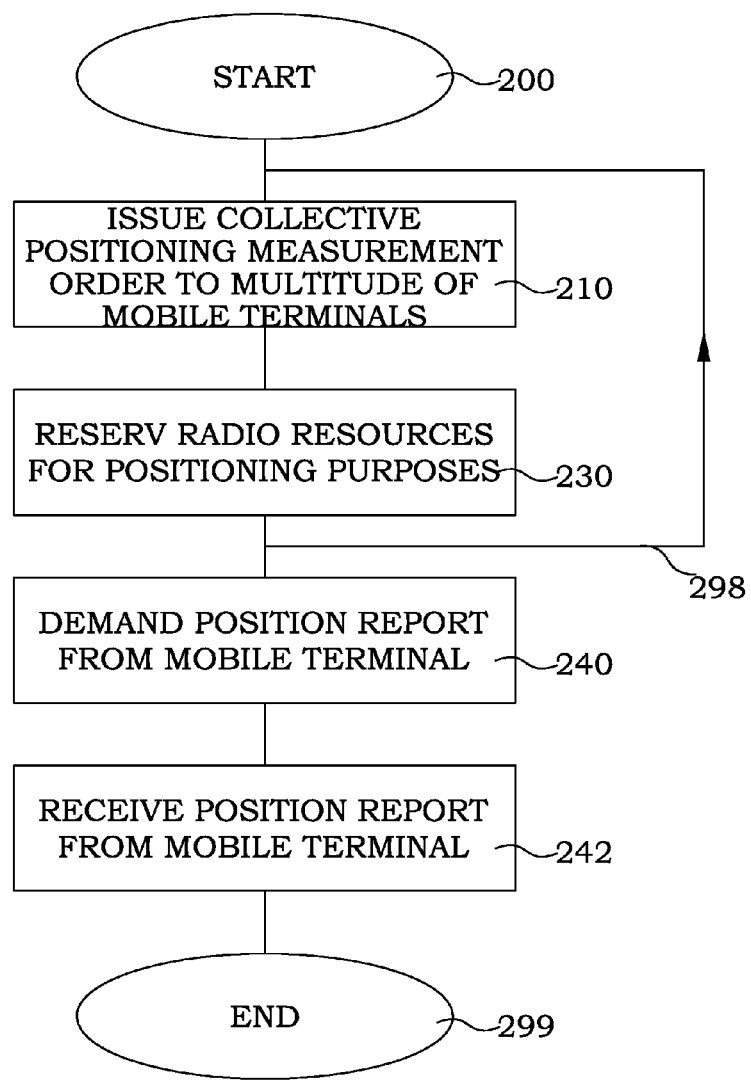

FIG. 3 illustrates a flow diagram of the main step of yet another embodiment of a method for managing a cellular communication system according to the present invention. The procedure starts in step 200. In step 210, a collective positioning measurement order is issued to a multitude of mobile terminals in a first cell of the cellular communication system. In this embodiment, the collective positioning measurement order concerns a terrestrially based positioning method. In step 230, resources dedicated to positioning measurements are reserved, within at least the cell for which the collective positioning measurement order concerns. This step typically occurs in connection with the order issuing, for ensuring the association between the order and the reservation. Depending on the type of radio communication utilized in the cellular communication network, the reserved resources could be of different nature, e.g. resources comprising at least one of the dimensions of frequency, time slot and code. Also, the reserved resources could concern uplink resources, downlink resources or both. The steps 210 and 230 are preferably repeated intermittently at a multitude of times according to a predetermined rule as indicated by the arrow 298. The order of steps 210 and 230 are not crucial, and the actual reservation (step 230) can be performed before or simultaneous as the actual issuing of the collective positioning measurement order (step 210).

The present embodiment also comprises the further step 240, in which a report of a determined position or data related thereto is demanded from at least one mobile terminal in the cell. In step 242, at least one report of determined position of a mobile terminal is received as a result of the report demand. The procedure ends in step 299.

Anyone skilled in the art realizes that the different steps in the embodiments of FIGS. 1-3 could be combined in any way that is technically compatible. For instance, the demanding and reporting steps could be omitted from the embodiment of FIG. 3 or included in the embodiments of FIG. 1 or 2. The demanding and reporting steps could also be merged into any of the steps 210 or 220 or as a separate step within the repetition loop 298, thereby causing a repetitive reporting of positions. The targeted mobile terminals for such reporting could be equal to the terminals doing the positioning or any part selection thereof.

The repetition of the issuing step 210 can be performed according to different principles. The predetermined times could e.g. occur regularly or triggered by any other communication system conditions. Furthermore, the issuing of a collective positioning measurement order in one cell could be coordinated with other cells, in particular the neighboring cells. For example, the actual positioning performed as a result of the step of issuing 210 can be performed at a different time in relation to cells within interference distance.

This can be useful if simultaneous positioning in interfering cells causes interference in the positioning itself. In other systems, where interference is not a main concern during positioning, positioning performed as a result of the step of issuing 210 can be performed at the same time in a multitude of cells.

Figure 4:
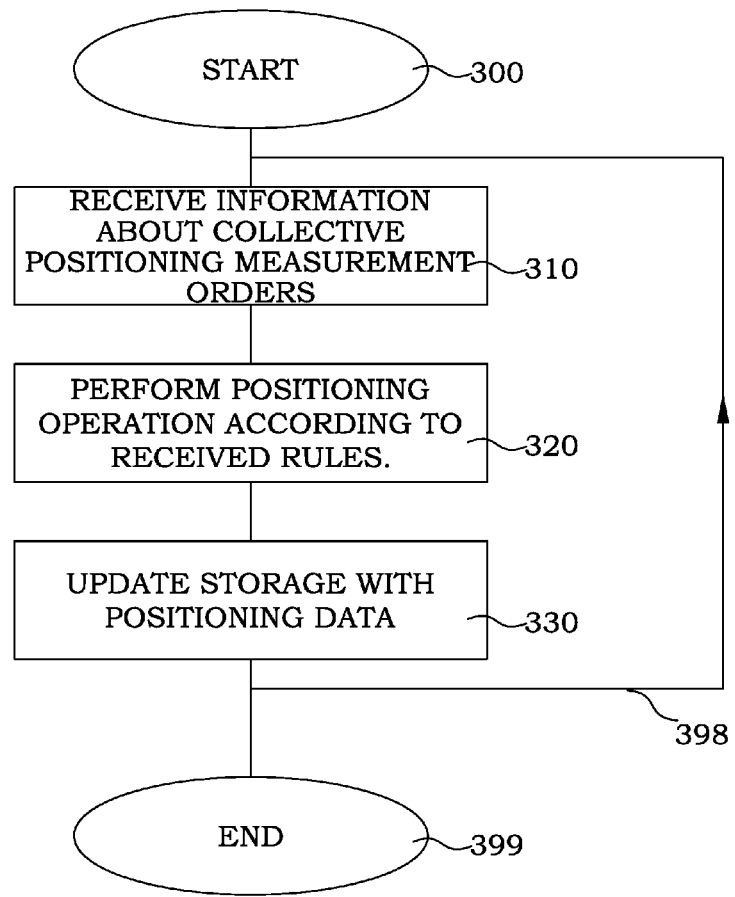
FIGS. 4-7 are flow diagrams of main steps of embodiments of methods for managing a mobile terminal according to the present invention.

Methods for managing a cellular communication system according to the present invention obviously have a counterpart method in the managing of mobile terminals connected to the cellular communication system. In FIG. 4, a flow diagram illustrates main steps of an embodiment of a method for managing a mobile terminal for use in a cellular communication system according to the present invention. The embodiment starts in step 300. In step 310, information concerning a collective positioning measurement order is received from a base station of the cellular communication system. In this particular embodiment, the information concerning a collective positioning measurement order is intended to be an immediate collective positioning measurement order, requesting the mobile terminal to perform positioning as soon as possible according to instructions comprised e.g. in the information concerning a collective positioning measurement order. In step 320, a positioning operation is performed according to a predetermined rule based on the information concerning the collective positioning measurement order. This operation can generally be an actual positioning measurement and/or the transmission of an uplink ranging signal. In this particular embodiment, the positioning operation is a positioning measurement. In this particular embodiment, the predetermined rule is "first possible occasion". Finally, in step 330, a storage with positioning data in the mobile terminal is updated with positioning data obtained by the positioning measurement. This data could be in the form of raw measurement data, partly processed measurement data, or even a completely determined position obtained from the positioning measurement data. The steps 310, 320 and 330 are preferably repeated, as indicated by the arrow 398, intermittently at a multitude of times. The procedure ends in step 399.

Figure 5:
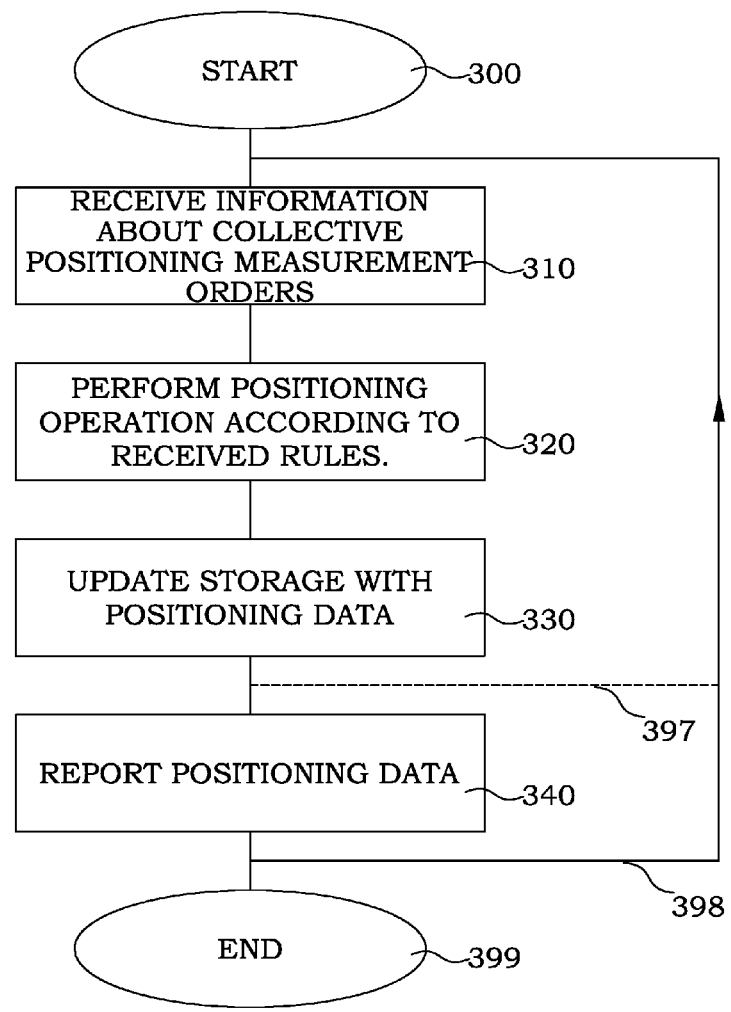

In FIG. 5, a flow diagram illustrates main steps of another embodiment of method for managing a mobile terminal for use in a cellular communication system according to the present invention. The embodiment starts in step 300. In step 310, information concerning a collective positioning measurement order is received from a base station of the cellular communication system. In step 320, a positioning operation is performed according to a predetermined rule based on the information concerning the collective positioning measurement order. In step 330, a storage with positioning data in the mobile terminal is updated with positioning data obtained by the positioning measurement. Finally, in step 340, the updated positioning data is reported to a positioning node in the cellular communication system. The steps 310, 320, 330 and 340 are preferably repeated, as indicated by the arrow 398, intermittently at a multitude of times. This means that the new position or at least data enabling determination of a new position always is reported back to the communication system. The procedure ends in step 399.

In the embodiment of FIG. 5, the reporting of positions will cause a lot of signaling traffic. In an alternative embodiment, the reporting of measured positioning data does not follow every time a new positioning measurement is performed. This is indicated by the broken line 397 in FIG. 5. The occasions at which reporting is performed could instead be dependent on any other combination of parameters and signals. The reporting could e.g. still be performed intermittently, but at a lower frequency than the actual measurements are performed. For instance, the positioning data could be reported at every n:th measurement. Such a parameter n can be determined for each communication system to suit the particular prevailing conditions. One could also imagine that reporting is performed if the updated positioning data differs from the last reported data by a certain amount. For instance, reporting could be performed if an updated position differs by more than 100 meters since the last report. The reporting could also be performed on demand. As indicated in FIG. 3 above, reports could be demanded by the positioning node of the communication system, and the reporting step in FIG. 5 could be initiated by such a demand.

Figure 6:
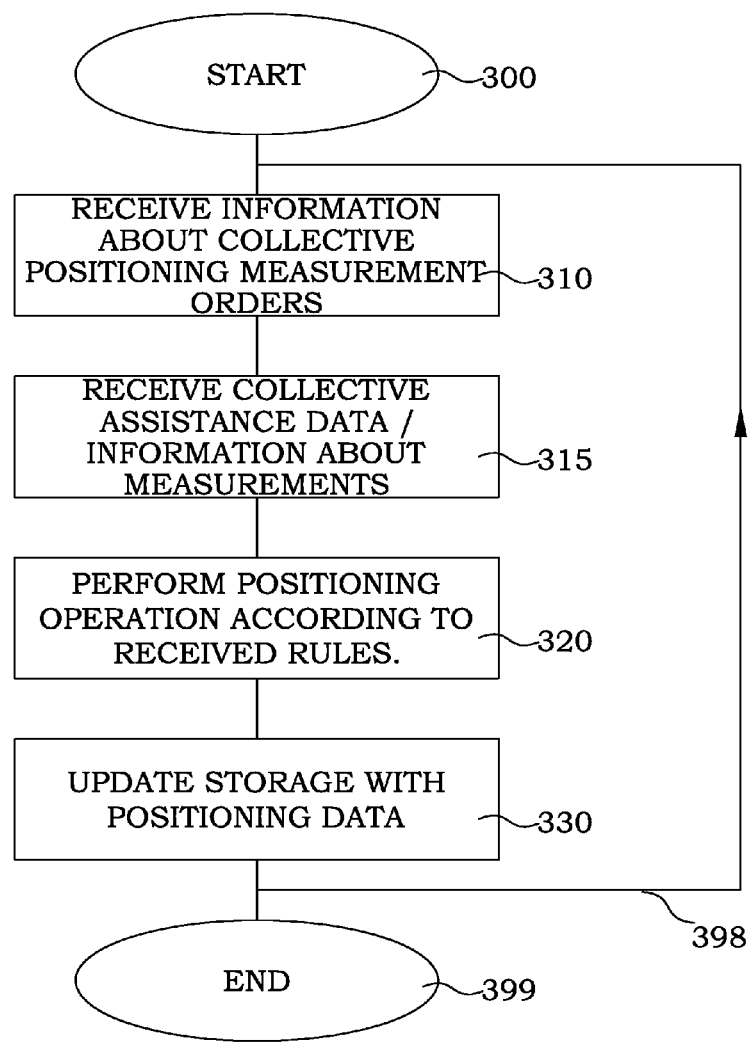

In FIG. 6, a flow diagram illustrates main steps of yet another embodiment of a method for managing a mobile terminal for use in a cellular communication system according to the present invention. The embodiment starts in step 300. In step 310, information concerning a collective positioning measurement order is received from a base station of the cellular communication system. In step 315, additional information in assisting in the positioning is received, e.g. from a collective transmission (see FIG. 2). This additional information could e.g. be assistance data for A-GPS positioning or information informing about which radio resources that are to be used for terrestrial positioning methods. In step 320, a positioning operation is performed according to a predetermined rule based on the information concerning the collective positioning measurement order and the additional information in assisting in the positioning. In step 330, a storage with positioning data in the mobile terminal is updated with positioning data obtained by the positioning measurement. The steps 310, 320 and 330 are preferably repeated, as indicated by the arrow 398, intermittently at a multitude of times. The procedure ends in step 399.

Figure 7:
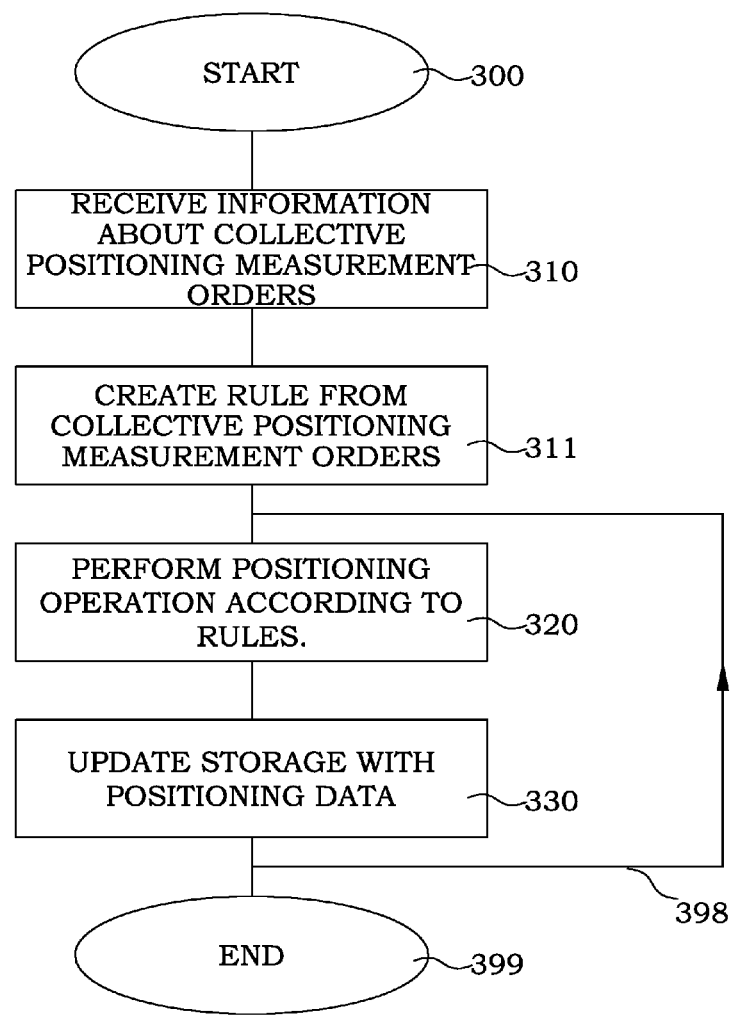

In FIG. 7, a flow diagram illustrates main steps of yet another embodiment of method for managing a mobile terminal for use in a cellular communication system according to the present invention. In this embodiment, it is assumed that the mobile terminal is provided with certain amount of predetermined data concerning rules for positioning management. This can for instance be the case if collective positioning of mobile terminals becomes a part of any future standard. The embodiment starts in step 300. In step 310, information concerning a collective positioning measurement order is received from a base station of the cellular communication system. This information can e.g. be provided when a mobile terminal connects/is handed over to a certain cell. This information comprises cell specific information about collective positioning, which can not be determined directly in any standards. For instance if different resources are used in different cells, such information requires updating at e.g. handover. This would mean that additional handover triggered signaling would be needed. In step 311, the mobile terminal creates rules for how and when collective positioning is to be performed, preferably intermittently at a multitude of times, based on the received information concerning a collective positioning measurement order. In step 320, a positioning operation is performed according to the created rule. Finally, in step 330, a storage with positioning data in the mobile terminal is updated with positioning data obtained by the positioning measurement. The steps 320 and 330 are preferably repeated, as indicated by the arrow 398, intermittently at a multitude of times according to the created rules. The receiving step and the rule creating step are not necessarily incorporated within the repetition, since the created rule could be generally applicable until the terminal is disconnected from the cell. The procedure ends in step 399.

The embodiment of FIG. 7 can also be applicable if more than one collective positioning is ordered at a time. The information concerning the collective positioning measurement order comprises in such a case a set of collective positioning measurement orders to be performed intermittently. The rules created in step 311 then correspond to set of collective positioning measurement orders, which are performed within the repetition 398. The number of positioning events may not even be limited since the information concerning the collective positioning measurement order may simply comprise a time scheme when said collective positioning measurement are to be performed. e.g. based on a predetermined time that should lapse between consecutive collective positioning measurements.

Anyone skilled in the art realizes that the different steps in the embodiments of FIGS. 4-7 could be combined in any way that is technically compatible. For instance, the reception of assisting data from the embodiment of FIG. 6 could be included in the embodiments of FIG. 4, 5 or 7. The reporting step 340 could also appear in embodiments based on FIG. 4, 6 or 7.

Figure 8:
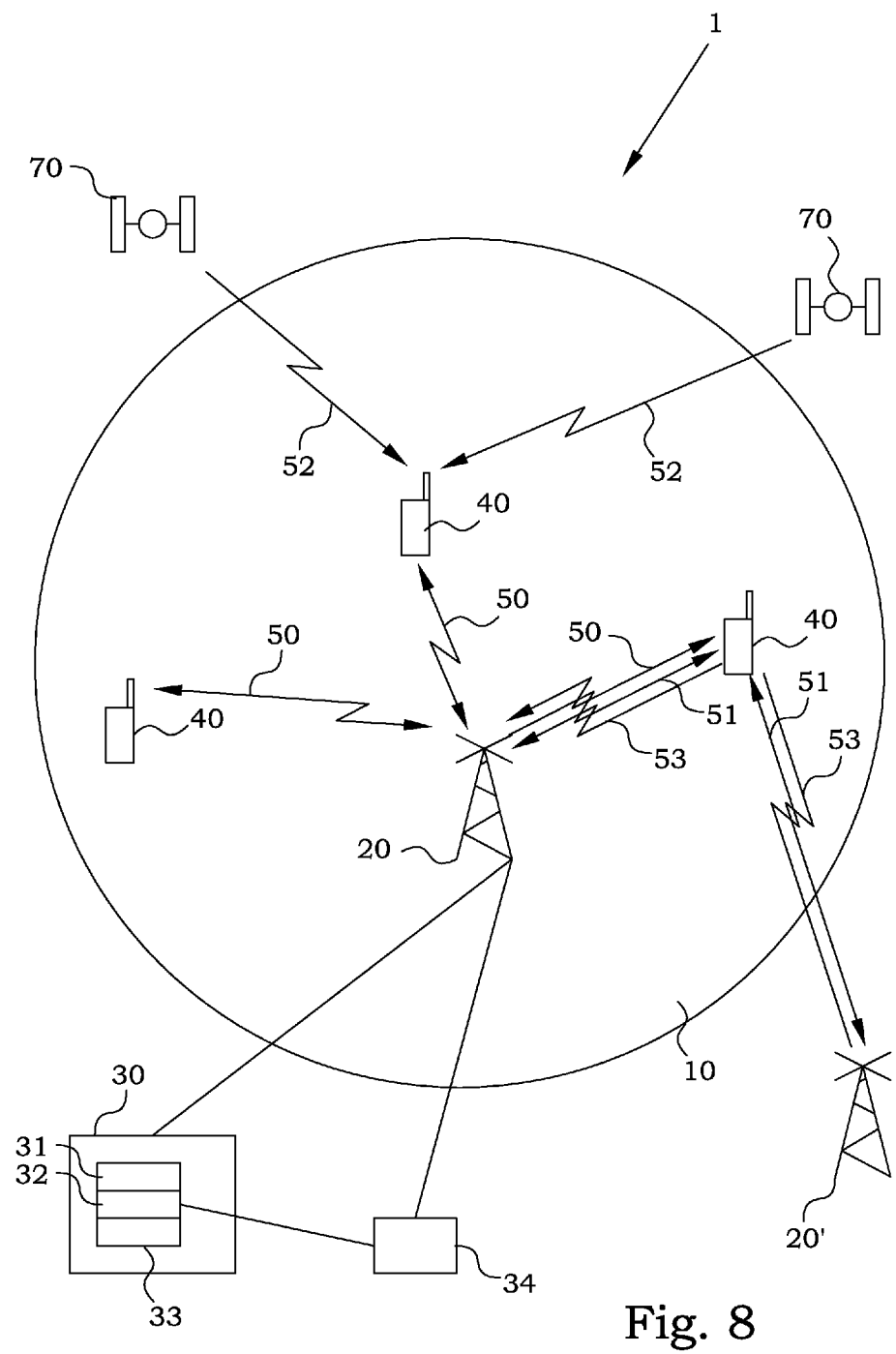
FIG. 8 is a block diagram illustrating a part of a cellular communication system in which an embodiment of a cellular communication system node according to the present invention is utilized.

The above described methods can easily be implemented in different cellular communication systems and mobile terminals. FIG. 8 illustrates schematically some parts of an embodiment of a cellular communication system 1. A Base Station (BST) 20 is associated with a cell 10 of the cellular communication system 1 and manages the traffic to and from mobile terminals 40 within the cell area. The BST 20 is connected to a core network of the cellular communication system 1. In particular, a positioning node 30 is responsible for actions connected to collective positioning of mobile terminals. According to the present invention, a collective positioning measurement order is issued to a multitude of mobile terminals 40 in the cell 10 of the cellular communication system 1, and in the present embodiment, the positioning node 30 comprises means 31 for issuing such information. The means 31 for issuing is preferably arranged for performing the issuing activity intermittently at a multitude of times according to a predetermined rule. The information is transferred via the BST 20 as a radio signal message 50 to the mobile terminals 40.

The collective positioning measurement order may concern positioning based on satellite signals 52, emitted from satellites 70 or other space vehicles. The collective positioning measurement order may additionally or alternatively concern positioning based on radio signals 51, 53 of the cellular communication system 1 itself. Such signals could comprise downlink signals 51 emitted from the BST 20 of the own cell 10 or from BST's 20' of neighboring cells. The signals could also be uplink signals 53 emitted by the mobile terminals 40. Non-exclusive examples of positioning technologies are OTDOA-IPDL, UTDOA and Cell ID enhanced with distance measure.

The multitude of mobile terminals can be selected in different ways. In one embodiment, the multitude of mobile terminals comprises all mobile terminals within the cell that has capability for a determined type of positioning. The multitude of mobile terminals could generally comprise any specified subset of mobile terminals within the cell. One obvious choice is then to comprise all mobile terminals within the cell. Furthermore, the timing of the operation of the means 31 for issuing can also be designed in different manners. The performance of one collective positioning gives advantages in terms of reduced signaling. However, additional advantages are achieved if the collective positionings are performed at successive time instants, since information from the earlier positioning might be useful in the later one. The predetermined times could e.g. occur regularly. Another aspect is the timing in relation to other cells. In certain positioning techniques, it is disadvantageous to perform positioning at the same time in two interfering cells. In such a case, the means for issuing 31 is preferably arranged to perform the issuing at a different time in relation to other cells within interference distance. However, in other positioning techniques, it may on the contrary be beneficial to perform the positioning in all cells simultaneously. In such a case, the means for issuing 31 is arranged to correlate its operation with surrounding cells and perform the issuing at the same time in relation to a multitude of cells.

One benefit from synchronizing positioning for a multitude of mobile terminals based on terrestrial signals is that resources can be reserved and dedicated and adapted in order to function as suitable positioning signals. Therefore, in a particular embodiment of the present invention, the positioning node 30 further comprises means 32 for reserving resources dedicated to collective positioning measurement. This functionality is of course connected to the means 31 for issuing, for assuring the correspondence therebetween. The form of these reserved resources depends on the particular cellular communication technique that is utilized, and may comprise resources of frequency, time and/or code dimensions. The reserved resources may also comprise uplink resources or downlink resources or both. In some communication systems, allocation and characteristics of radio resources are determined by a radio resource handling node, illustrated in the embodiment of FIG. 8 as a node 34. The means 32 for reserving resources then cooperates with the radio resource handling node 40 for providing the appropriate reservations.

One aspect of a positioning node 30 in a cellular communication system 1 is also to provide the actual mobile terminal positions. In FIG. 8, the positioning node 30 comprises a compiling means 33, which is arranged for demanding a report of determined position or information associated with a position from the mobile terminals 40 in the cell 10. The compiling means 33 is thereby also configured to receive reports of determined positions or information associated therewith from the mobile terminals 40.

The embodiment of FIG. 8 comprises many features, all of which are not absolutely necessary in all situations. However, anyone skilled in the art realizes that one or more of the functionalities discussed in connection with FIG. 8 may be omitted without prohibiting the basic operation of the communication system. The necessary means for performing the invention are defined by the enclosed independent patent claims.

Figure 9:
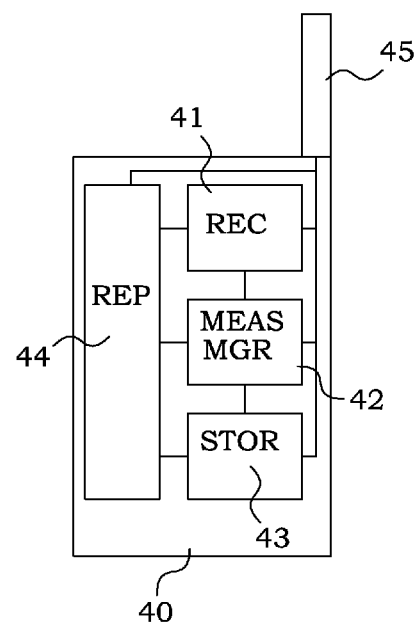
FIG. 9 is a block diagram of an embodiment of a mobile terminal according to the present invention.

The mobile terminals also have arrangements for positioning managing. FIG. 9 illustrates schematically some parts of an embodiment of a mobile terminal 40 according to the present invention. The mobile terminal 40 in this embodiment comprises a receiver 41, connected to an antenna arrangement 45. The receiver is arranged for receiving information concerning a collective positioning measurement order. The collective positioning measurement order is intended to emanate from a base station of the cellular communication system, to which the mobile terminal is connected. The mobile terminal 40 further comprises a positioning manager 42. The positioning manager 42 is connected to the receiver 41, from which it is instructed about how to perform the operations. If the collective positioning is performed on downlink signals, such as satellite signals or downlink terrestrial signals, the positioning manager 42 typically comprises a positioning signal detector. If positioning is to be performed on uplink signals, the positioning manager comprises means for transmitting uplink ranging signals. In the present embodiment, positioning based on downlink signals is described. The positioning manager 42 is thereby connected to the antenna arrangement 45 and arranged for performing positioning measurements according to the instructions. These measurements are preferably performed intermittently at a multitude of times according to a predetermined rule based on the information concerning the collective positioning measurement order.

If the positioning capabilities of the mobile terminal comprise satellite positioning, such as e.g. A-GPS, the antenna arrangement 45 comprises antenna means capable of receiving satellite signals as well as radio signals of the cellular communication system.

The mobile terminal 40 further comprises a data storage. The data storage 43 is connected to the positioning manager 42 and arranged for storing positioning data from the positioning manager 42. The positioning data can be raw measurement data, partly processed measurements or actual positions of the mobile terminal.

The information concerning the collective positioning measurement order received by the receiver 41 comprises in particular embodiments a time scheme when said positioning measurement are to be performed. The positioning manager 42 is then arranged to perform the positioning measurements accordingly. In another embodiment, the information concerning the collective positioning measurement order comprises a set of collective positioning measurement orders intended to be performed intermittently. The positioning manager 42 is also here arranged to perform the positioning measurements accordingly.

In the embodiment of FIG. 9, the mobile terminal 40 further comprises a report handler 44. The report handler 44 is arranged for reporting positioning data obtained by the positioning manager 42 to a positioning node of the cellular communication system. The positioning data can be obtained directly from the positioning manager 42 or from the data storage 43. The reporting of the positioning data can be done in connection to each positioning measurement. However, the reporting can also be initiated by some sort of external event. One such external event could e.g. be a received demand from a positioning node of the core network. The receiver 41 is thereby arranged to receive such a reporting from the positioning node. Furthermore, the report handler 44 is connected to the receiver 41 and arranged to be responsive to a demand from the positioning node.

The embodiment of FIG. 9 comprises many features, all of which are not absolutely necessary in all situations. However, anyone skilled in the art realizes that one or more of the functionalities discussed in connection with FIG. 9 may be omitted without prohibiting the basic operation of the communication system. The necessary means for performing the invention are defined by the enclosed independent patent claims.

The timing of the collective positioning measurement is of importance. Frequent positioning updates result in stored positioning data in the mobile terminals that are relatively fresh. When an actual collective positioning is requested, different scenarios can be considered. If the collective positioning is frequent enough, it might be sufficient just to retrieve the result of the last collective positioning from a mobile terminal. A positioning node then sends a demand to the mobile terminal to report its latest positioning data. Such a retrieval of data can be performed extremely fast since no actual measurements are to be performed. This significantly reduces the response time.

Even if the updating frequency is not fast enough to ensure that the latest positioning data is completely satisfactory in terms of accuracy, the latest positioning data can be reported as a first estimation of the position. Such data can be useful to have during the response time for a new positioning measurement.

As mentioned before, even if the latest positioning data is not accurate enough as such, it may be sufficiently accurate to serve as input data to the positioning procedure. For satellite based positioning, an approximate position may significantly reduce the processing power needed for achieving ranging signals and/or enabling use of reduced sets of ranging signals. A good first position approximation may therefore influence the final accuracy, the response time as well as the availability.

However, a frequent updating of all mobile terminals does indeed occupy some resources, in form of radio resources not usable for actual traffic as well as in form of processing power and/or power consumption e.g. in the mobile terminals. A trade off between the expected benefits and drawbacks has to be considered in each application of the ideas of the present invention. A typical time between successive updates is believed to be somewhere between a second and an hour.

The current approach in all prior art cellular systems is to handle terminal positioning on a connection oriented basis. This means that a separate measurement order needs to be transmitted to the terminal, for each positioning attempt. At the contrary, the present invention proposes the use of a generally valid positioning command, e.g. for all capable terminals within a cell that initiates a positioning of said all capable terminals of a cell. Such collective ordering obviously saves signaling resources. Multicast/broadcast of collective positioning commands is not a part of cellular systems of prior art.

The reporting of collective positioning results may be conditional, so that only the terminals that are explicitly positioned by an external or internal user need to report back to the positioning node. The other terminals are only refreshed. i.e. their stored data concerning positioning information is updated. Such a mode would save further signaling resources. This would be ideally suited for mobile terminals using A-GPS and/or AGNSS for positioning purposes.

The present invention also has architectural impacts. The positioning node is affected by the proposed invention, in that no separate request from the Core Network (CN) is needed in order to initiate positioning of all capable terminals in served cell. Put otherwise, the connection oriented handling of the positioning function is no longer the only rule. Instead, the positioning node, e.g. the RNC in WCDMA, needs to be equipped with functionality for repeated collective positioning of all, or a selected set of capable terminals of the cell. One instance of such functionality is probably needed for each cell since the assistance data, e.g. for A-GPS, is typically valid per cell.

The present invention can be directly applicable to several types of positioning methods. Satellite based systems, such as A-GPS, or the coming AGNSS, i.e. the Galileo satellite navigation system, can advantageously be used. However, also terrestrial positioning methods, based on time of arrival, time difference of arrival and angle of arrival measurements, in terminals (downlink) or in multiple location monitoring units (uplink) can be applied.

A few non-exclusive examples will be discussed somewhat more in detail below, also illustrating further advantages of the present invention.

Figure 10:
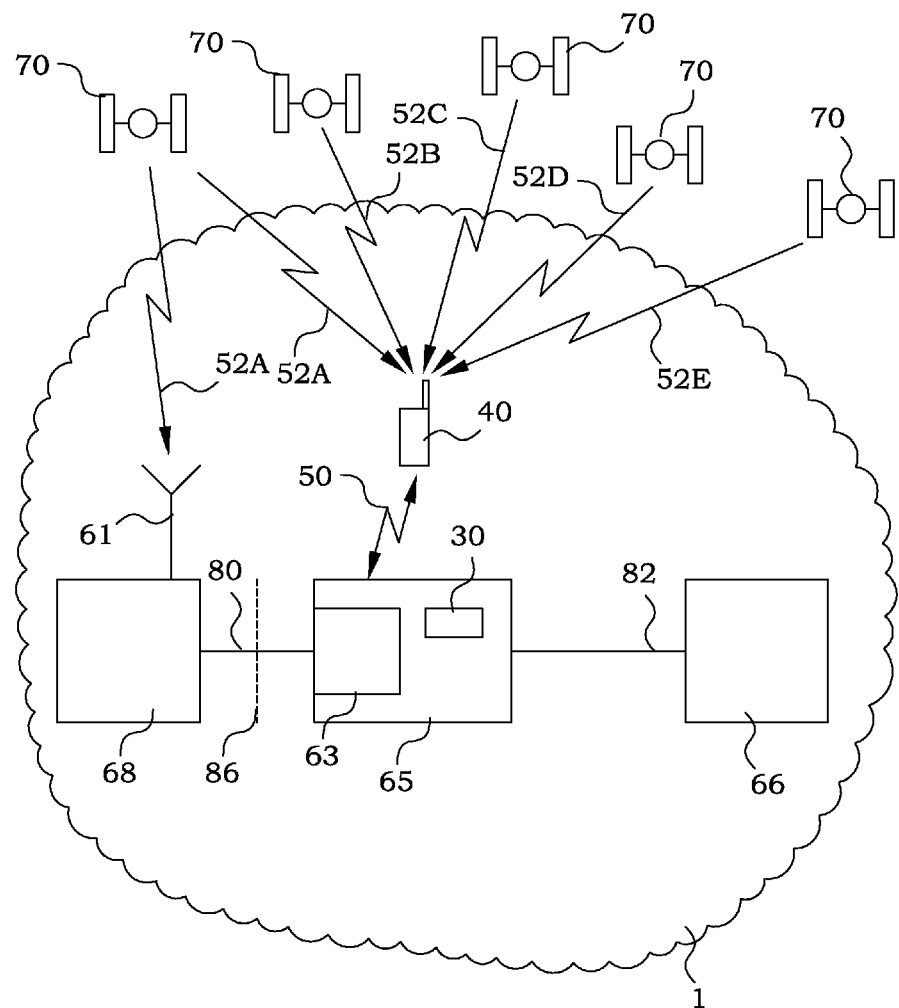
FIG. 10 is a block diagram illustrating an embodiment of a cellular communication system supporting satellite based positioning.

Assisted GPS (A-GPS) positioning is an enhancement of the global positioning system (GPS). An example of an A-GPS positioning system, in this example applied in a WCDMA cellular communication system 1, is displayed in FIG. 10. A position of a mobile terminal 40 can be determined by using signals 52A-E emanating from space vehicles 70, i.e. typically satellites. The positioning procedures are in this example assisted by additional data provided from a reference receiver 68 connected to the cellular communications system 1. The reference receiver 68 is locked to the emitted signals 52A-E from all visible satellites 70, which signals 52A-E an antenna 61 receives. (The figure only illustrates one such received signal 52A.) The received signal 52A carries data that can be used as assistance data, which is useful for positioning also of other devices. When the data is transmitted to the GPS receiver in the mobile terminal 40, it may therefore enhance the performance of the terminal receiver. Typically, A-GPS accuracy can become as good as 10 meters also without differential operation. The accuracy becomes worse in dense urban areas and indoors, where the sensitivity is often not high enough for detection of the very weak signals from the GPS satellites.

The locking to the satellite signal 52A provides knowledge of a satellite time reference, defining the timing of the emission of the ranging signals 52A-E. This timing definition is typically performed by referring to a frame time reference used by the cellular communications system 1, in which the mobile terminal 40 is used. The reference receiver 68 therefore has to be provided with accurate information about the frame time reference used by the cellular communications system 1. This means that at least a part of the reference receiver 68 has to be a part of the node creating the cellular frame structure, i.e. typically a radio base station, or to be listening or experiencing the cellular frame structure and its timing properties. The reference receiver 68 can be provided as one unit or divided in parts, thereby separating the determination of the satellite time reference and the satellite position data.

The received data 52A-E from the satellites 70 also comprise ephemeris data, i.e. among other things a satellite orbit prediction. It is also possible to use the so-called GPS almanac, which also provides a basis for determining satellite positions. Assistance data 80, comprising satellite position data and satellite time reference data, is in this particular example sent over a reference receiver interface 86 to a Radio Network Controller (RNC) 65. A satellite positioning interface 63 receives this data and may e.g. determine which satellites might be in such positions that their ranging signals 52A-E are probable to detect.

A collective positioning measurement order is initiated in a positioning node of the cellular communications system 1. If the positioning is to be synchronised with other parts of the cellular communication system 1, messages 82 controlling such synchronisation have typically to be transferred to and from the core network 66. The RNC creates radio signals 50 ordering collective positioning utilizing measurements of satellite ranging signals 52A-E and sends the radio signals 50 to all A-GPS capable mobile terminals 40 within the cell. The measurement order is accompanied by assistance data, either integrated in the order itself or as a separate collective message. The assistance data is typically processed in the satellite positioning interface 63. The mobile terminal 40 is equipped with a GPS receiver that is capable of detecting satellite ranging signals 52A-E and the mobile terminal 40 uses the assistance data to facilitate the locking on and measuring of the satellite ranging signals 52A-E. The measured ranging signals are then used to calculate a position of the mobile terminal 40 according to standard satellite positioning procedures. If user equipment based A-GPS is used, the processing of the ranging signals is performed in the mobile terminal 40. If user equipment assisted A-GPS is used, the ranging signals or representations thereof are stored for possible later use. Stored positions or data associated with ranging signals may be sent to the cellular communication network where the processing for purposes of positioning may be performed.

In A-GPS positioning three classes of performance can be defined. The class with the best performance is obtained with fine time assistance data from the network. This class represents a situation similar to locked-on stand alone GPS, where receiver search windows are well aligned and where all information needed for any position calculation has been demodulated and is known in the terminal. The typical performance is characterized by satellite detection levels of about −155 dBm or better, and with response times of about 5 seconds (dominated by signaling delays in today's cellular systems).

The second class with intermediate performance, represents a situation where the satellite detection performance is 5-10 dB worse than for the best class. The positioning delay is also worse, since the GPS receiver of the terminal needs to synchronize to GPS time.

The third class represents a stand alone GPS receiver, without adequate assistance data download (e.g. disconnected from the cellular system). In addition to time synchronization, the receiver needs to demodulate the navigation message that is superimposed on the ranging signals (50 Hz PSK).

This requires about 30 additional seconds and results in an additional sensitivity loss of 5-7 dB.

Note that the detection sensitivity is what determines the ability to lock-on to satellites, thereby strongly affecting availability. It is only the most sensitive class that has any useful indoor performance.

The use of fine time assistance data allows the satellite receiver of the mobile terminal 40 to obtain the best sensitivity possible. For A-GPS, it is thus well known that the sensitivity of a locked-on A-GPS receiver is 5-10 dB better than before lock-on. This is due to the need for the receiver in the terminal to synchronize to GPS time, a procedure that is generally more demanding than performing ranging measurements. For the same reason, the time to first fix (TTFF) is improved when the GPS receiver is repeatedly refreshed by repetitive positionings. The best performance is thus retained in a GPS receiver as long as it is positioned regularly. The navigation message demodulation is valid for at least 2 hours, whereas the validity of the GPS time synchronization depends on clock drifts. Hence the invention is applicable to A-GPS, to repeatedly position all (A-GPS capable) terminals, in order to maintain lock-on.

Fine time assistance data is a relatively vague expression. The meaning of fine time assistance in the present disclosure is time reference assistance having an accuracy typically of the order of some tens of microseconds. The order of magnitude of the accuracy has to be considerably less than the GPS C/A (Coarse/Acquisition) époque, which has a duration of 1 ms, if GPS is used.

Note that no transmission of ranging signals is involved in the actual cellular communication system. It is rather the distribution of assistance data, in combination with a collective measurement order, that needs to be performed repeatedly. Today, assistance data distribution may be performed centrally in WCDMA by means of broadcast, however, centralized collective positioning measurement orders cannot be issued in prior art WCDMA systems.

The effect of the proposed invention, as applied to A-GPS, would be to achieve the best performance class, for all terminals. This would be obtained by joint positioning of all, or a selected class of terminals, often enough. Put otherwise, the proposed invention can be interpreted as a new way to achieve fine time assistance in a cellular system.

It is stressed that the situation is similar for AGNSS positioning, i.e. for the Galileo satellite navigation system, and the present invention is applicable also to AGNSS positioning.

Similarly to A-GPS the uplink time difference of arrival (UTDOA) positioning method is based on time of arrival measurements. However, in the UTDOA case measurements of transmissions from the mobile terminals are performed in several radio base stations.

Figure 11:
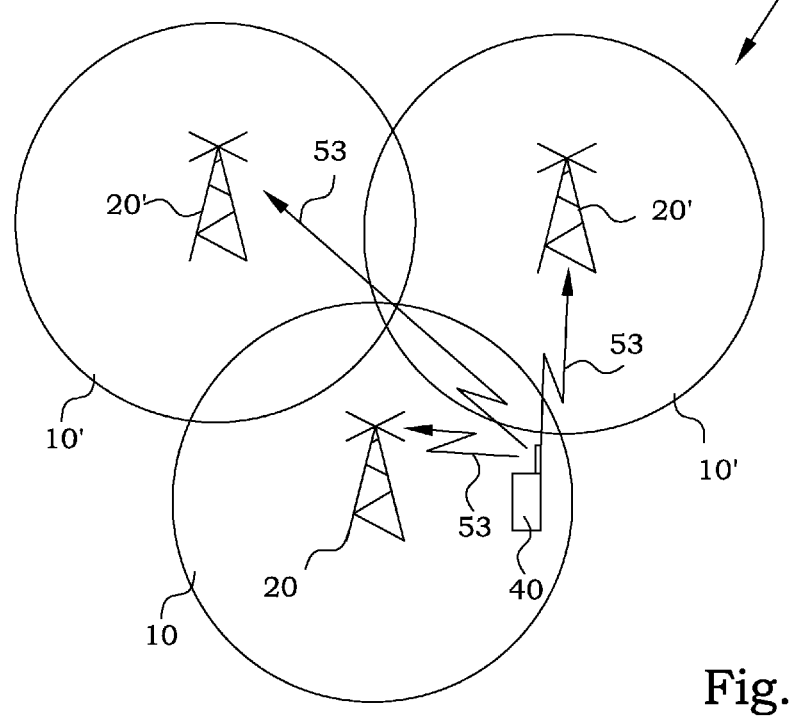
FIG. 11 is a block diagram illustrating an embodiment of a cellular communication system supporting terrestrial based positioning utilizing uplink ranging signals.

FIG. 11 illustrates an embodiment of a UTDOA system in a WCDMA cellular communication system, designed according to the present invention. A number of radio base stations (RBS) 20, 20' are associated with respective cells 10, 10'. A mobile terminal 40 is present within one cell 10 and is thereby connected to the RBS 20. However, also the RBS's 20' are within such a distance that radio signals from the mobile terminal 40 are detectable. When positioning is to be performed, the mobile terminal 40 is instructed to emit some type of uplink ranging signal 53 that is detectable by a plurality of RBS's 20, 20'. Typically, the mobile terminal 40 is not necessarily perfectly synchronized with the system time of the communication system, so the emission time is in most cases unknown. The RBS's 20, 20' records the time of arrival, and since they are synchronized with the system time, the arrival times at the different RBS's 20, 20' can be compared, e.g. by considering only differences in arrival times. Using these differences in arrival time, a position of the mobile terminal 40 can be obtained by triangulation.

An advantage with UTDOA as compared to A-GPS is the fact that the signal strengths are higher, something that enhances the ability to perform positioning indoors. The accuracy of UTDOA is expected to be somewhat worse than that of A-GPS though, mainly because the radio propagation conditions are worse along the surface of the earth than when GPS radio signals are received from satellites at high elevation angles.

In order to have good performance and to meet e.g. emergency positioning requirements, signals from the mobile terminal should preferably be detectable by 6-8 non co-located base stations. This will in general, not only require long measurement times, but also good signal conditions with respect to the transmitting mobile terminal. Note that the problem is particularly difficult in code division multiple access (CDMA) systems. The reason is that all sites transmit in the same frequency band. This results in a near-far problem, where mobile terminals close to the RBS of the own cell often transmits at a low power. This occurs since in CDMA systems the transmitting power of terminals is normally controlled by the RBS, so that all mobile terminals in the cell are detected at comparable power levels in the RBS. Hence terminals close to the RBS of the own cell are not likely to transmit at a power level that are sufficient for detection at far RBS's. Therefore, a mobile terminal to be positioned is typically ordered to power-up in order to secure hearabilty also in distant receiving sites.

By utilizing the ideas of the present invention, utilizing in particular the frequent and coordinated collective positioning measurement ordering and reservation of radio resources, several advantages can be achieved. A first advantage comes from the very existence of relatively recent positioning data. If a collective positioning measurement is ordered, and a recent position is known, such information can be utilized in the triangulation routines to increase the accuracy, or alternatively decrease the required number of detected arrival time measurements. Secondly, due to a coordinated reservation of radio resources, intelligent distribution of ranging signals would have the potential to reduce the need for dedicated special procedures like power up periods in UTDOA positioning.

Figure 12:
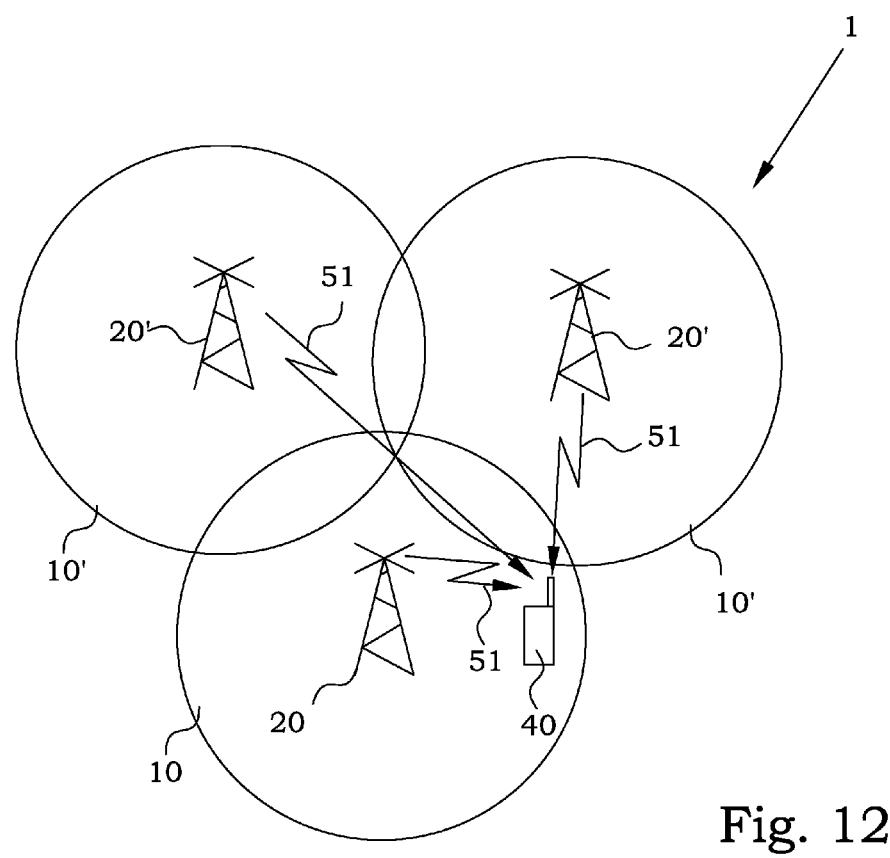
FIG. 12 is a block diagram illustrating an embodiment of a cellular communication system supporting terrestrial based positioning utilizing downlink ranging signals.

The present invention is applicable to positioning methods based on either downlink or uplink ranging signals, or at a combination thereof. Time difference of arrival measurements are of particular interest. There is e.g. also a counterpart to UTDOA specified in 3GPP, that operates in the downlink, i.e. measurements of time of arrivals of radio signals transmitted by several RBS's are performed in the mobile terminals. FIG. 12 illustrates such a situation. A number of radio base stations (RBS) 20, 20' are associated with respective cells 10, 10'. A mobile terminal 40 is present within one cell 10 and is thereby connected to the RBS 20. However, also the RBS's 20' are within such a distance that radio signals from the RBS's 20' are detectable in the mobile terminal 40. When collective positioning is to be performed, a plurality of RBS's 20, 20' are instructed to emit some type of downlink ranging signal 51 that is detectable by the mobile terminal 40. Typically, the mobile terminal 40 is not necessarily perfectly synchronized with the system time of the communication system, so the absolute arrival time is in most cases unknown. The RBS's 20, 20' are, however, synchronized with the system time, and the relations between the transmission times are therefore known. However, even if the absolute travel time can not directly be determined by the mobile terminal 40, the arrival times of ranging signals from the different RBS's 20, 20' can be compared, e.g. by considering differences in arrival times. Using these differences in arrival time, a position of the mobile terminal 40 can be obtained by triangulation procedures.

In practice in prior art systems, this OTDOA-IPDL method unfortunately lacks the sensitivity to provide any useful high precision performance. For terrestrial methods based on downlink measurements, the main obstacle is the number of detectable signals. In order to have good performance and to meet e.g. emergency positioning requirements, signals from at least 6-8 non co-located signal transmission positions need to be detected in a downlink based positioning system. This will in general, not only require long measurement times, but also good signal conditions with respect to the transmitting sites. Note that the problem is particularly difficult in code division multiple access (CDMA) systems. The reason is that all sites transmit in the same frequency band. This results in a near-far problem, where terminals close to the transmitting site of the own cell, experience extensive interference from said own site, a fact that prevents detection of signals from other more distant transmitting sites. This problem is exactly was has prevented actual implementation of the OTDOA-IPDL positioning method in prior art systems.

According to an embodiment of the present invention, dedicated positioning resources (ranging signals) are defined for positioning purposes. At regular intervals, known signals (or sequences) are sent from each cell in the system. The signals are preferably orthogonal between cells in order to increase the detectability in the terminals. At these regular intervals all terminals perform measurements on the transmitted signals. In this manner, near-far problems can be reduced significantly, which increases the chances to detect enough downlink ranging signals for positioning purposes. Furthermore, since a recent position is known, the triangulation routines can use such information in order to reduce the number of required detected ranging signals.

In the above examples, a WCDMA cellular communication system has been used as an example. However, the present ideas are not limited to any particular type of cellular communication system, but are generally applicable on any cellular technology. Non-exclusive examples are GSM, WCDMA and system based on Orthogonal Frequency Division Multiplexing (OFDM).

In a communication system that uses OFDM, the data is sent in parallel over several carriers. Since the data is transmitted in parallel, the time duration of each OFDM symbol can be made much longer than the length of the time dispersion of the radio channel. In an OFDM system, a downlink based collective positioning method could operate according to the following.

All base stations transmit regularly, e.g. each 100th frame, a particular sequence or signature on a reserved resource. These signatures should be mutually orthogonal between the base stations. The mobile terminals can then utilize an arrival time of the signals of these signatures to calculate their positions, or at least update their data concerning positioning information.

If this procedure is standardized in the system, the mobile terminal can be configured when locked onto the system, to recognize the signatures as characteristic for ranging signals. The mobile terminal can thereby be instructed by the system to perform positioning measurements each time such signatures are found. Alternatively, the mobile terminals are informed about the times when the signatures are expected. The procedure necessary in the mobile terminal in this embodiment is a typical example of the method illustrated by FIG. 7, since the configuration then operates as the information concerning a collective positioning measurement order.

Of course, also an OFDM scenario may operate with "on demand" approaches, where actual collective positioning measurement orders are distributed.

If the OFDM system is synchronized, such a coordinated transmission of ranging signals is easily achieved, since all base stations send their signatures simultaneously. For non-synchronized networks, or at least badly synchronized networks, the ranging signals may have to be transmitted with "guard periods" before and after, to compensate the time difference between different base stations. There are also some types of sequences that have a small correlation even if they are not perfectly time aligned, and such sequences are then preferably utilized.

The present disclosure presents techniques that enable centralized positioning of all capable terminals, or a selected set thereof, of at least one cell in a cellular system. Frequently repeated, e.g. periodic, positioning of said all terminals of at least one cell of a cellular system is provided. Moreover cellular communication resources, such as bandwidth, power, time slots and codes are reserved for dedicated use for mobile terminal positioning. The methods are directly applicable to satellite based positioning systems, such as A-GPS or AGNSS, as well as to terrestrial positioning methods, based on e.g. time of arrival, time difference of arrival and angle of arrival measurements, in terminals (downlink) or in multiple location measurement units (uplink).

The performance of the positioning function is typically improved when terminals are positioned repeatedly. The handling of the positioning function in the node that serves the terminal may be simplified, since less dedicated signaling is needed. It may be possible to remove all terminal specific signaling, treating positioning as a basic capability of the system and terminals and using only broadcast of assistance data information.

Furthermore, signaling resources, for ordering of positioning measurements, are reduced, since all terminals are ordered to perform a positioning measurement, using a single command. In the most extreme form, no command is needed, positioning is performed anyway.

The consumed signaling resources and terrestrial ranging resources (when applicable) are minimized since the majority of terminals are using the same assistance information and ranging signals (when applicable). This represents a significant difference as compared to current terrestrial ranging technology. The reason is that rather than performing all ranging measurements at a time for a specific terminal, all terminals can update their ranging measurements using several frequent blocks of ranging information, e.g. using incoherent integration. This has the potential to remove the need for dedicated procedures like power up in the uplink for the current WCDMA UTDOA method.

The detectability of the transmitted signal is increased in the terrestrial positioning case. This is achieved by using sequences with desired properties, e.g. using orthogonal signals in different (adjacent) cells.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method, performed at a positioning node, for managing a cellular communication system, the method comprising:
    issuing a single collective positioning measurement order to a plurality of mobile terminals in a first cell of said cellular communication system, wherein the collective positioning measurement order comprises an order that indicates how the plurality of mobile terminals are to perform a positioning operation;
    performing said issuing at least one time according to a predetermined rule; and
    reserving signal resources dedicated to positioning measurement during a time interval comprising a time at which measurements are to be performed.

2. The method of claim 1 wherein performing said issuing at least one time comprises intermittently performing said issuing a plurality of times.

3. The method of claim 1 wherein said collective positioning measurement order comprises an order to determine positioning based on satellite signals.

4. The method of claim 1 wherein collective positioning measurement order comprises an order to determine positioning based on signals communicated by said cellular communication system.

5. The method of claim 4 wherein said collective positioning measurement order comprises an order to determine positioning using a technique selected from the list of:
    Observed Time Difference of Arrival-Idle Period Down Link (OTDOA-IPDL);
    Uplink Time Difference of Arrival (UTDOA); and
    Cell ID enhanced with a distance measurement.

6. The method of claim 1 wherein reserving signal resources dedicated to positioning measurement during a time interval comprising a time at which measurements are to be performed comprises reserving the signal resources at the time at which measurements are to be performed according to said collective positioning measurement order.

7. The method of claim 1 wherein said reserved signal resources comprise resources of at least one of Frequency resources, time slot resources, and code resources.

8. The method of claim 1 wherein said reserved signal resources comprise resources of at least one of uplink resources and downlink resources.

9. The method of claim 8 wherein said collective positioning measurement order comprises at least one of:
    an order to measure characteristics of a downlink ranging signal; and
    an order to transmit an uplink ranging signal.

10. The method of claim 1 wherein reserving signal resources reserves resources to be used in positioning operations at a time that is different than a time for a cell that is within interference distance.

11. The method of claim 1 wherein reserving signal resources reserves resources to be used for positioning at the same time in a plurality of cells.

12. The method of claim 1 wherein said plurality of mobile terminals comprises all mobile terminals within said first cell that are capable of determining a position using a specified type of positioning technique.

13. The method of claim 1 wherein said plurality of mobile terminals comprises a specified subset of all mobile terminals within said first cell.

14. The method of claim 1 wherein said plurality of mobile terminals comprises all mobile terminals within said first cell.

15. The method of claim 2 wherein intermittently performing said issuing a plurality of times comprises intermittently performing said issuing at substantially regular intervals.

16. The method of claim 1 further comprising receiving reports of determined positions of one or more mobile terminals in said first cell.

17. The method of claim 16 further comprising:
    requesting a report of determined position from at least one mobile terminal in said first cell; and
    receiving the report responsive to the request.

18. A method for managing a mobile terminal used in a cellular communication system and disposed in a first cell, the method comprising:
    receiving information associated with a single collective positioning measurement order sent from a base station of said cellular communication system to a plurality of mobile terminals, wherein the information associated with the collective positioning measurement order indicates how the plurality of mobile terminals are to perform a positioning operation, and wherein the information associated with the collective positioning measurement order comprises a time scheme that defines when said positioning operations are to be performed; and performing a positioning operation according to a predetermined rule based on said information.

19. The method of claim 18 wherein performing a positioning operation comprises performing the positioning operation intermittently a plurality of times according to said predetermined rule based on said information.

20. The method of claim 18 wherein said positioning operation comprises performing a positioning measurement operation.

21. The method of claim 20 further comprising updating a stored positioning data in memory with positioning data obtained from performing the positioning measurement operation.

22. The method of claim 18 wherein said positioning operation comprises transmitting an uplink ranging signal.

23. The method of claim 18 wherein said information associated with said collective positioning measurement order comprises a set of collective positioning measurement orders.

24. The method of claim 18 further comprising reporting positioning data obtained from performing a positioning measurement to a positioning node of said cellular communication system.

25. The method of claim 24 wherein reporting the positioning data comprises reporting the positioning data responsive to receiving a command from said positioning node.

26. A cellular communication system node comprising:
a positioning manager configured to issue a single collective positioning measurement order to a plurality of mobile terminals in a first cell of a cellular communication system, wherein the collective positioning measurement order comprises an order that indicates how the plurality of mobile terminals are to perform a positioning operation;
said positioning manager configured to issue said collective positioning measurement order at least once based on a predetermined rule; and
an allocator connected to the positioning manager, and configured to reserve resources dedicated to positioning measurement during a time interval comprising a time at which measurements are to be performed.

27. The cellular communication system node of claim 26 wherein said positioning manager is further configured to issue said collective positioning measurement order intermittently a plurality of times based on said predetermined rule.

28. The cellular communication system node of claim 26 wherein said collective positioning measurement order includes information associated with positioning based on satellite signals.

29. The cellular communication system node of claim 26 wherein said collective positioning measurement order defines positioning measurements based on signals received from said cellular communication system.

30. The cellular communication system node of claim 29 wherein said collective positioning measurement order comprises an order to determine positioning using a technique selected from the list of:
Observed Time Difference of Arrival-Idle Period Down Link (OTDOA-IPDL);
Uplink Time Difference of Arrival (UTDOA); and
Cell ID enhanced with a distance measurement.

31. The cellular communication system node of claim 26 wherein said allocator is configured to reserve the resources during a time interval comprising the time at which measurements are to be performed according to said collective positioning measurement order.

32. The cellular communication system node of claim 26 wherein said reserved signal resources comprise resources of at least one of Frequency resources, time slot resources, and code resources.

33. The cellular communication system node of claim 26 wherein said reserved signal resources comprise resources associated with at least one of uplink resources and downlink resources.

34. The cellular communication system node of claim 33 wherein said collective positioning measurement order comprises at least one of:
an order to measure one or more characteristics of a downlink ranging signal; and
an order to transmit an uplink ranging signal.

35. The cellular communication system node of claim 26 wherein said allocator is configured to reserve signal resources to be used in positioning operations at a time that is different than a time for a cell that is within interference distance.

36. The cellular communication system node of claim 26 wherein said allocator is configured to reserve resources used in positioning operations that occur at the same time in a plurality of cells.

37. The cellular communication system node of claim 26 wherein said plurality of mobile terminals comprises all mobile terminals within said first cell capable of performing positioning operations according to a determined type of positioning.

38. The cellular communication system node of claim 26 wherein said plurality of mobile terminals comprises a specified subset of all mobile terminals within said first cell.

39. The cellular communication system node of claim 26 wherein said plurality of mobile terminals comprises all mobile terminals within said first cell.

40. The cellular communication system node of claim 26 wherein said plurality of times occurs regularly.

41. The cellular communication system node of claim 26 further comprising a report receiver configured to receive reports of determined positions of mobile terminals of said first cell.

42. The cellular communication system node of claim 41 further comprising a positioning node configured to issue a command to request a report of determined position from at least one mobile terminal in said first cell.

43. A mobile terminal for use in a cellular communication system, the mobile terminal disposed in a first cell and comprising:
a receiver configured to receive information associated with a single collective positioning measurement order sent from a base station of said cellular communication system to a plurality of mobile terminals, wherein the information associated with the collective positioning measurement order indicates how the plurality of mobile terminals are to perform a positioning operation;
a positioning manager connected to said receiver and configured to perform the positioning operation in accordance with a predetermined rule based on said information; and
wherein said information associated with said collective positioning measurement order comprises a time scheme that defines when said positioning operations are to be performed.

44. The mobile terminal of claim 43 wherein said positioning manager is configured to perform said positioning operation intermittently at a plurality of times according to said predetermined rule based on said information.

45. The mobile terminal of claim 43 wherein said positioning manager comprises a positioning detector, and whereby said positioning operation comprises performing a positioning measurement.

46. The mobile terminal of claim 45 further comprising data storage connected to said positioning manager, and configured to store positioning data received from said positioning detector.

47. The mobile terminal of claim 43 wherein said positioning manager comprises a transmitter for transmitting a ranging signal.

48. The mobile terminal of claim 43 wherein said information associated with said collective positioning measurement order comprises a set of collective positioning measurement orders.

49. The mobile terminal of claim 43 further comprising a reporting module configured to report positioning data obtained by said positioning manager to a positioning node of said cellular communication system.

50. The mobile terminal of claim 49 wherein said reporting module is configured to report the positioning data responsive to a request received from said positioning node.

* * * * *

UNITED STATES PATENT AND TRADEMARK OFFICE
CERTIFICATE OF CORRECTION

Page 1 of 1

| | |
|---|---|
| PATENT NO. | : 9,031,576 B2 |
| APPLICATION NO. | : 12/438470 |
| DATED | : May 12, 2015 |
| INVENTOR(S) | : Wigren et al. |

It is certified that error appears in the above-identified patent and that said Letters Patent is hereby corrected as shown below:

In the Drawings

In Fig. 3, Sheet 2 of 10, for Tag "230", in Line 1, delete "RESERV" and insert -- RESERVE --, therefor.

In the Specification

In Column 2, Line 32, delete "hearabilty" and insert -- hearability --, therefor.

In Column 3, Line 56, delete "positioning:" and insert -- positioning; --, therefor.

In Column 8, Line 35, delete "performed. e.g." and insert -- performed, e.g. --, therefor.

In Column 9, Line 54, delete "handling node 40" and insert -- handling node --, therefor.

In Column 11, Line 60, delete "refreshed. i.e." and insert -- refreshed, i.e. --, therefor.

In Column 13, Line 5, delete "node of" and insert -- node 30 of --, therefor.

In Column 15, Line 11, delete "hearabilty" and insert -- hearability --, therefor.

Signed and Sealed this
First Day of March, 2016

Michelle K. Lee
*Director of the United States Patent and Trademark Office*